US 7,754,128 B2

(12) United States Patent
Amano et al.

(10) Patent No.: US 7,754,128 B2
(45) Date of Patent: Jul. 13, 2010

(54) WINDOW ASSEMBLY MANUFACTURING METHOD AND WINDOW PANE

(75) Inventors: Katsuyuki Amano, Obu (JP); Akihiro Suzuki, Obu (JP); Tatsuya Tamura, Obu (JP); Hisao Kondo, Okazaki (JP)

(73) Assignee: Tokai Kogyo Co., Ltd., Obu-shi (JP)

( * ) Notice: Subject to any disclaimer, the term of this patent is extended or adjusted under 35 U.S.C. 154(b) by 1135 days.

(21) Appl. No.: 10/563,374

(22) PCT Filed: Jun. 14, 2004

(86) PCT No.: PCT/JP2004/008311

§ 371 (c)(1),
(2), (4) Date: Feb. 21, 2006

(87) PCT Pub. No.: WO2005/005127

PCT Pub. Date: Jan. 20, 2005

(65) Prior Publication Data

US 2006/0157890 A1      Jul. 20, 2006

(30) Foreign Application Priority Data

Jul. 15, 2003   (JP) ............................ 2003-274994
May 31, 2004   (JP) ............................ 2004-161136

(51) Int. Cl.
*A61M 25/00* (2006.01)
(52) U.S. Cl. ..................... 264/264; 264/259; 264/265
(58) Field of Classification Search ................ 264/265, 264/264, 259
See application file for complete search history.

(56) References Cited

U.S. PATENT DOCUMENTS

| 4,839,122 A | | 6/1989 | Weaver |
| 5,095,669 A | | 3/1992 | Kunert et al. |
| 5,544,458 A | * | 8/1996 | Fisher et al. ............ 52/204.591 |
| 5,676,898 A | * | 10/1997 | Yokota et al. ................ 264/219 |
| 6,120,274 A | | 9/2000 | Gerig et al. |

FOREIGN PATENT DOCUMENTS

EP       0 096 128 A1     12/1983

(Continued)

*Primary Examiner*—Philip C Tucker
*Assistant Examiner*—Amjad Abraham
(74) *Attorney, Agent, or Firm*—Oliff & Berridge, PLC

(57) ABSTRACT

An adhesive agent is uniformly applied to a back surface of a window pane, the application made to an area where a covering member is planned to be adhered and to an area where a positioning fixture and a holding portion are planned to be adhered, the application is also made continuously such that adhesive agent layers of both planned adhesion areas being continuous with an adhesive agent continuous area in between. After that, the window pane and the positioning fixture are set in an injection mold and a polymer material is injected in the mold. This results that the covering member and the holding portion are formed into a shape where they are connected by a connection portion for material flow, which connection portion is formed at a position other than the adhesive agent continuous area. The forming results that the covering member and the holding portion are adhered and fixed to the back surface of the window pane with the adhesive agent layers in between. After the forming process above, the connection portion for material flow is removed.

10 Claims, 12 Drawing Sheets

SECTIONAL VIEW TAKEN ALONG LINE B—B

FOREIGN PATENT DOCUMENTS

| | | |
|---|---|---|
| EP | 0 672 513 A1 | 9/1995 |
| JP | 02254013 A * | 10/1990 |
| JP | A-2-254012 | 10/1990 |
| JP | A 02-254013 | 10/1990 |
| JP | A 07-308939 | 11/1995 |
| JP | B 2554537 | 8/1996 |
| JP | 2002096633 A * | 4/2002 |
| JP | A 2002-096633 | 4/2002 |
| JP | A-2005-47257 | 2/2005 |

* cited by examiner

SECTIONAL VIEW TAKEN ALONG LINE A—A

SECTIONAL VIEW TAKEN ALONG LINE B—B

SECTIONAL VIEW TAKEN ALONG LINE C-C

WINDOW ASSEMBLY MANUFACTURING METHOD AND WINDOW PANE

TECHNICAL FIELD

The present invention relates to a method of manufacturing a window assembly attached to a window frame of an automobile or the like and a window pane employed in the manufacture of the window assembly.

BACKGROUND ART

A window assembly attached to a window frame of an automobile is generally provided with a long covering member disposed along a peripheral edge of a window pane for covering a gap between the window pane and the window frame. A paste-like adhesion/sealant is interposed between a back surface of the peripheral edge of the window pane and the window frame and cured so that the window assembly is adhered and fixed to the window frame and sealing is provided between the window assembly and the window frame. It usually takes two days and nights (about 48 hours, for example) to cure the paste-like sealant completely. Accordingly, when the window assembly is to be attached to the window frame, a fixing member provided on a predetermined part of the back surface of the peripheral edge of the window pane is engaged with an engagement hole formed in the window frame, whereby the window assembly is temporally fixed to the window frame in a positioned state. Consequently, the window assembly is prevented from being displaced until the sealant is cured.

Thus, when the window assembly including the window pane provided with the covering member and the fixing member is manufactured, an adhesive is applied to a predetermined adhesion area of the covering member of the window pane and a predetermined adhesion area of a holding portion holding the fixing member, so as to be discontinuously separated, as described in Patent Document 1 (gazette of Japanese Patent No. 2554537). Subsequently, the window pane to which the adhesive has been applied and the fixing member are set in an injection mold. A resin material injected into a cavity for molding of the covering member is also caused to flow via a material flow cavity into a cavity used for molding of the holding portion, so that the covering member and the holding portion are formed into a shape in which the covering member and the holding portion are coupled to each other by a material flow connection portion, whereby the covering member and the holding portion are adhered to the window pane thereby to be fixed to the window pane. The material flow connection portion is removed thereafter.

In this method, an adhesive is applied to a predetermined adhesion area of the covering member and a predetermined adhesion area of the holding portion of the window pane discontinuously and separately. Consequently, the material flow connection portion between the covering member and the holding portion can be prevented from being adhered to the window pane, whereupon the material flow connection portion can easily be removed.

Patent Document 1: gazette of Japanese Patent No. 2554537 (page 2 and the like)

DISCLOSURE OF THE INVENTION

Problem to be Overcome by the Invention

In the above-described patent document 1, however, a work for applying the adhesive to the window pane needs to be divided into a plurality of times since the adhesion is applied to the predetermined adhesion area of the covering member and the predetermined adhesion area of the holding portion of the window pane discontinuously and separately. A plate-shaped template (stencil) having the same size as the window pane and a hole in the predetermined adhesion area of the holding portion needs to be used in the case of manual work. This complicates the adhesion applying work and tends to cause a difference in a thickness of adhesive layer and a drying time between both areas, whereupon there is a possibility of deviation in adhesive strength.

Furthermore, in a method, an adhesive is applied by sliding applying head in contact with the window pane while a liquid adhesive is being supplied to the applying head made of a porous material such as sponge, felt or the like. In this method, an applying head needs to apply the adhesive to one predetermined adhesion area and thereafter to be parted from the window pane and to be moved to the subsequent predetermined adhesion area. Consequently, the adhesive applying work is complicated. Moreover, the adhesive supplied to the applying head is excessively reserved in the applying head while the applying head is being parted from the window pane and moved. As a result, there is a possibility that excessive amount of adhesive may be applied to a subsequent predetermined adhesion area, and consequently, the adhesive layer of the subsequent predetermined adhesion area would excessively be thickened or a drying time would excessively be increased. That is, since a forming step starts before the adhesive layer is completely dried, there is a possibility that a adhesive strength may be reduced. Additionally, since the predetermined adhesion area of the holding portion has a narrow range of adhesive application, the applying head cannot almost be slid and can only be pressed against the window pane, whereupon it is difficult to apply the adhesive so as to obtain a uniform thickness.

The present invention was made in view of the foregoing circumstances and an object of the invention is to carry out the adhesive applying work efficiently in the production of window assembly and to remove a material flow connection portion easily after forming of the covering member or the like while the adhesive can uniformly be applied to each predetermined adhesion area with the result of improvement in the adhesive quality.

Means for Overcoming the Problem

To address at least the foregoing, a method of manufacturing a window assembly in an exemplary embodiment includes a window pane attachable to a predetermined window frame, a long covering member made of a polymer material and formed integrally along at least a part of a peripheral edge of the window pane in order that a gap between the window pane and the window frame may be covered by the covering member and a positioning member secured to a back surface of the peripheral edge of the window pane so as to be away from the covering member toward a surface center of the window pane in order that the window pane may be positioned relative to the window frame, the method comprising an adhesive applying step continuously applying an adhesive to a predetermined adhesion area of the covering member of the window pane and a predetermined adhesion area of the positioning member and a holding portion holding the positioning member so that adhesive layers of both predetermined adhesion areas are continuous via an adhesive connection area to each other, a forming step in which the window pane to which the adhesive has been applied and the positioning member are set in an injection mold having a cavity for forming the covering member, a cavity for forming the holding portion and a polymer material flow cavity causing both cavities to communicate with each other at a position other than the adhesive connection area, and a predetermined polymer material is injected into the injection mold to fill the injection mold so that the covering member and the holding portion are formed into a shape obtained by connecting the covering member and the holding portion to each other by a material flow connection portion formed by the polymer material flow cavity and so that the covering member and the holding portion are adhered via the respective adhesion layers to the window pane thereby to be fixed, and a step of removing the material flow connection portion after the forming step.

In this method, the adhesive is continuously applied to the predetermined adhesion area of the covering member of the window pane and the predetermined adhesion area of the positioning member and the holding portion. Accordingly, since a work of applying the adhesive to the window pane need not be divided into a plurality of times, the adhesive applying work can efficiently be carried out, and the adhesive can uniformly be applied to each predetermined adhesion area. Since a thickness of the adhesive layer of each predetermined adhesion area and a drying time are substantially equalized, stable adhesive strength can be obtained. Moreover, the used injection mold has a cavity for forming the covering member, a cavity for forming the holding portion and a polymer material flow cavity causing both cavities to communicate with each other at a position other than the adhesive connection area. Consequently, the material flow connection portion between the covering member and the holding portion can be prevented from being adhered to the window pane and accordingly can easily be removed.

On the other hand, limitation to the configuration of a cavity of the injection mold or the shape of the positioning member is increased when the covering member and the holding portion are formed with the positioning member being set in the injection mold.

In view of the foregoing, a positioning member previously manufactured separately may be attached to the holding portion after the covering member and the holding portion have been made of the predetermined polymer material. Consequently, since the positioning member need not be set in the injection mold in the forming, limitation to the configuration of a cavity of the injection mold or the shape of the positioning member is reduced. As a result, the construction of the injection mold can be simplified, and the degree of freedom in the design of the positioning member can be increased.

Furthermore, the covering member and the positioning member may be made of a predetermined polymer material simultaneously by the injection molding. Consequently, since the positioning member can be made of the polymer material which is used to make the covering member, the number of parts can be reduced and the positioning member need not be mounted.

Furthermore, in an exemplary embodiment, in the adhesive applying step, an application range of the adhesive applied to the predetermined adhesion area of the positioning member of the window pane and/or the predetermined adhesion area of the holding portion is broader than an outer configuration of an end face of the positioning member and/or the holding portion at the adhesive side. Consequently, the positioning member and the holding portion can reliably be adhered to the window pane even if an application range of the adhesive layer differs to some degree.

Furthermore, the window pane may be moved in the adhesive applying step while an applying head for applying the adhesive to the window pane is fixed to a position. Consequently, the construction of an adhesive applier can be simplified as compared with the case where the applying head is moved to apply the adhesive, and a low cost can be realized. Furthermore, after completion of the adhesive applying step, the window pane can smoothly be conveyed to a subsequent step (a heating-drying step, for example) by continuously using a system, such as a robot or the like, which has moved the window pane.

Furthermore, in the forming step, a tab may be formed integrally on the material flow connection portion formed by the polymer material flow cavity so as to protrude in such a direction as to depart from the back surface of the window pane. Consequently, when the material flow connection portion is to be removed, the tab is pinched and pulled in such a direction that the material flow connection portion is parted from the back surface of the window pane thereby to be removed. Accordingly, a work of removing the material flow connection portion can be rendered easier.

Furthermore, at least a part of the window pane to which the adhesive is applied may be preheated in the forming step. Consequently, in the injection of polymer material, a solvent for the adhesive applied to the window pane can stably be volatilized, whereupon the adhesive strength can be stabilized.

In exemplary embodiments, the adhesive applying steps can be eliminated, and a window pane having predetermined applied areas to which an adhesive has continuously been applied can be previously obtained and the window assembly can be manufactured. Consequently, this method can achieve the same effects as the embodiments including the adhesive applying steps.

Effect of the Invention

As obvious from the foregoing, according to the present invention, the adhesive applying work can be simplified and carried out efficiently in the case of manufacturing a window assembly. Furthermore, since the adhesive is uniformly applied to each predetermined adhesion area, the adhesive layers have substantially the same thickness and drying time. Consequently, the material flow connection portion can easily be removed after forming of the covering member and the like while the quality of adherent property can be improved.

EXPLANATION OF REFERENCE SYMBOLS

Figure 1:
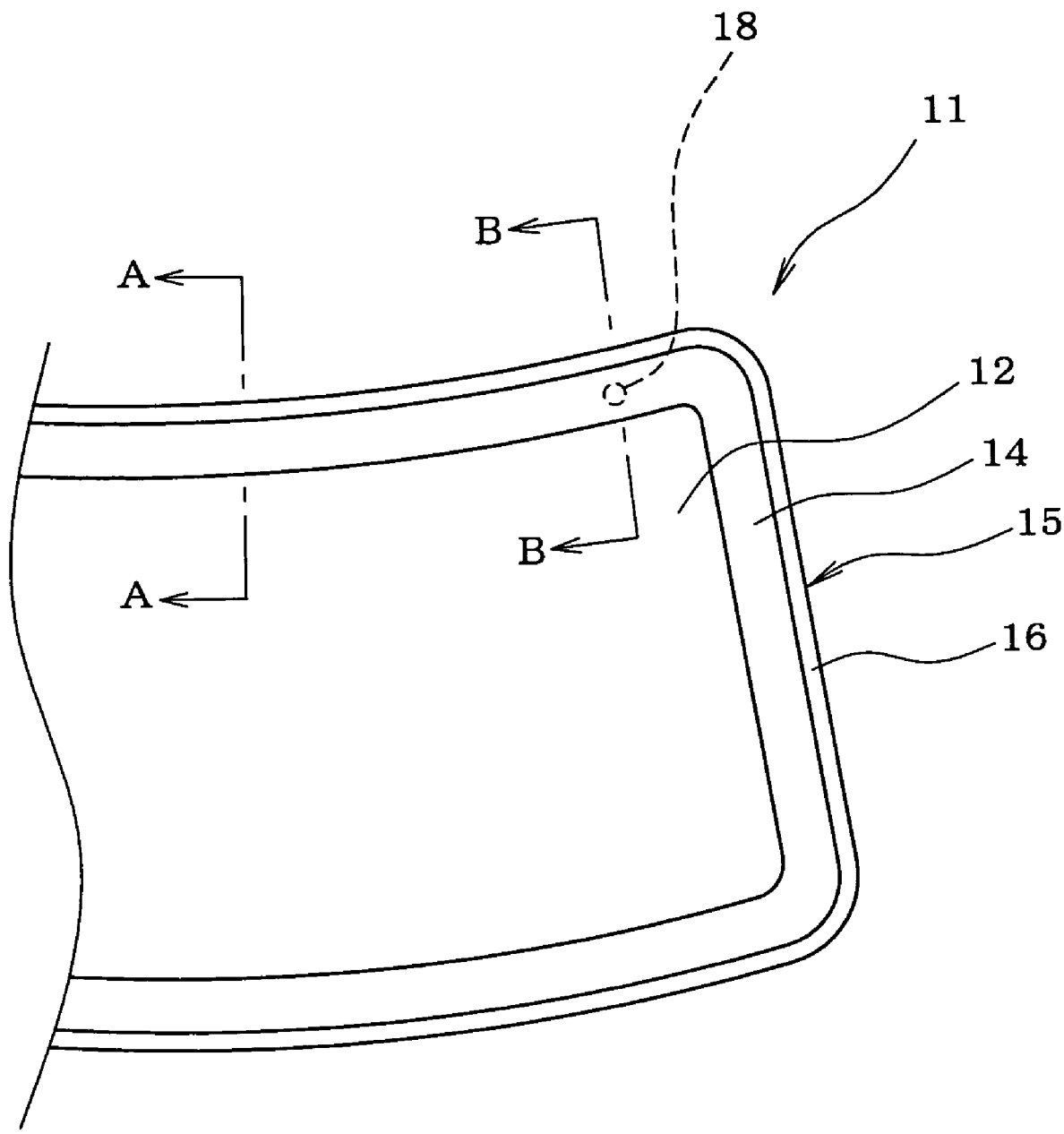
FIG. 1 A front view of a major part of the window assembly of a first embodiment in accordance with the present invention.

11 ... window assembly, 12 ... window pane, 13 ... window frame, 14 ... opaque colored layer, 15 ... covering member, 18 ... positioning fixture (positioning member), 19 ... pedestal, 20 ... holding portion, 21 ... engagement portion, 23 ... engagement hole, 24 ... adhesive applying apparatus, 28 ... applying head, 29 ... adhesive applying section, 31 ... first adhesive layer, 32 ... second adhesive layer, 35 ... injection mold, 36 ... covering member forming cavity, 37 ... holding portion forming cavity, 38 ... polymer material flow cavity, 42 ... material flow connection portion, 43 ... tab, 44 ... tab forming cavity, 47 ... sealant, 48 ... injection mold, 49 ... window assembly, 50 ... positioning member, 53 ... injection mold, 54 ... positioning member forming cavity, 55 ... window assembly, 56 ... window pane, 57 ... covering member and 59 ... window frame.

BEST MODE FOR CARRYING OUT THE INVENTION

The following is description of four embodiments 1 to 4 in each of which the present invention is applied to a window assembly for a rear window of an automobile.

Embodiment 1

Embodiment 1 of the invention will be described with reference to FIGS. 1 to 7. Firstly, an outline structure of the window assembly 11 for rear window will be described with reference to FIGS. 1 to 3. The window assembly 11 includes a window pane 12 (rear window glass) formed into a shape (gently curved generally rectangular shape, for example) corresponding to a window frame 13 (see FIG. 2) to which the window pane 12 is to be attached. The window pane 12 has a back surface with an opaque colored layer 14 (also called "frit layer" when the window pane is glass) formed along a peripheral edge of the window pane 12 and having a predetermined width. The opaque colored layer 14 prevents the back surface of the peripheral edge of the window pane 12 from being viewed therethrough at the surface side of window pane 12.

Figure 2:
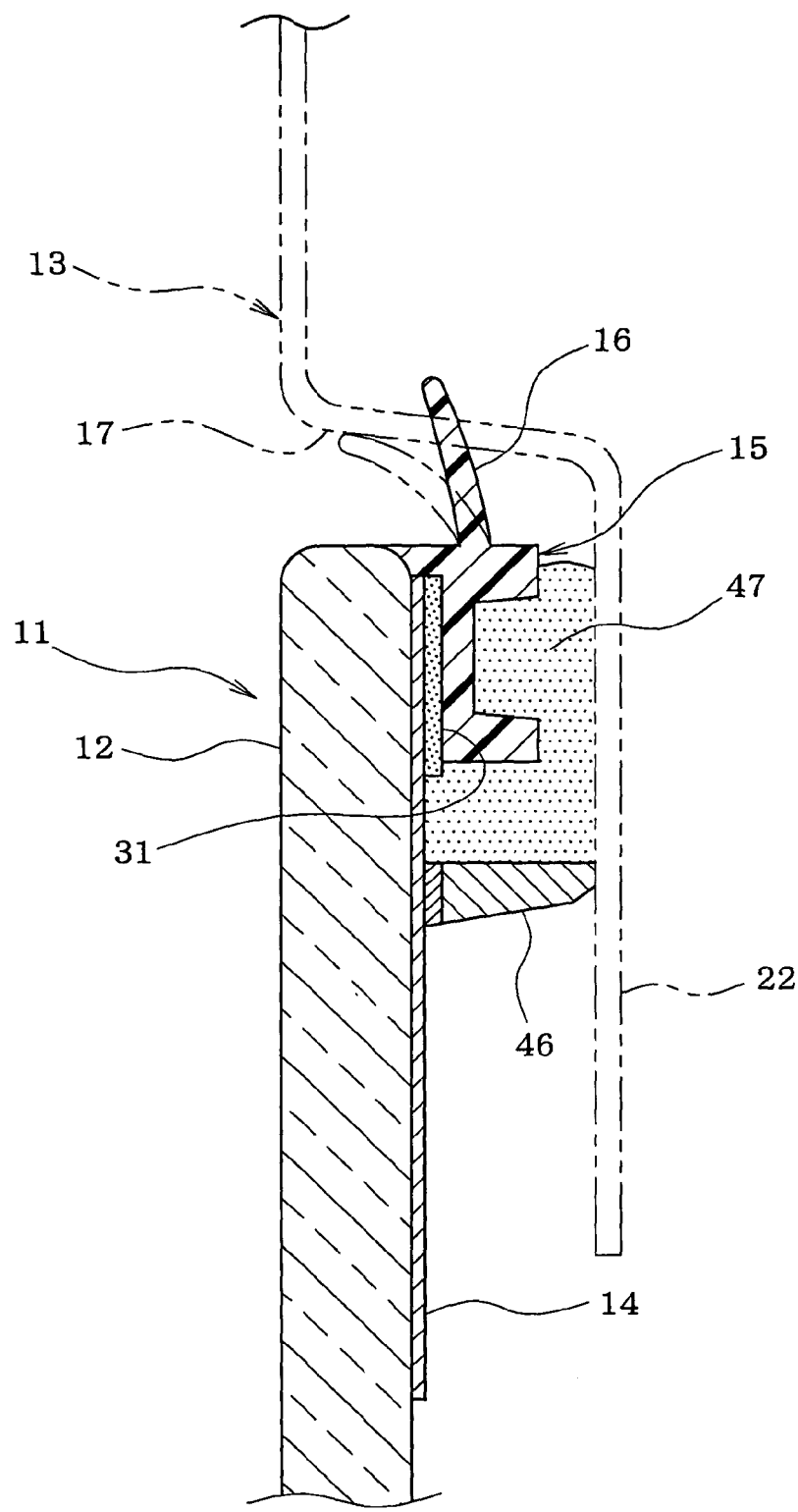
FIG. 2 A sectional view taken along line A-A in FIG. 1.

A long covering member 15 is provided along the peripheral edge of the window pane 12 (peripheral edge of opaque colored layer 14) on the back surface of the window pane 12, as shown in FIG. 2. The covering member 15 is made by injection molding from a predetermined polymer material and is adhered and fixed to the opaque colored layer 14 of the window pane 12 by a first adhesive layer 31 which will be described later. An elastically deformable lip 16 is formed integrally on a base of the covering member 15. The lip 16 abuts against a peripheral wall 17 of the window frame 13, thereby covering a gap between the window pane 12 and the window frame 13.

Figure 3:
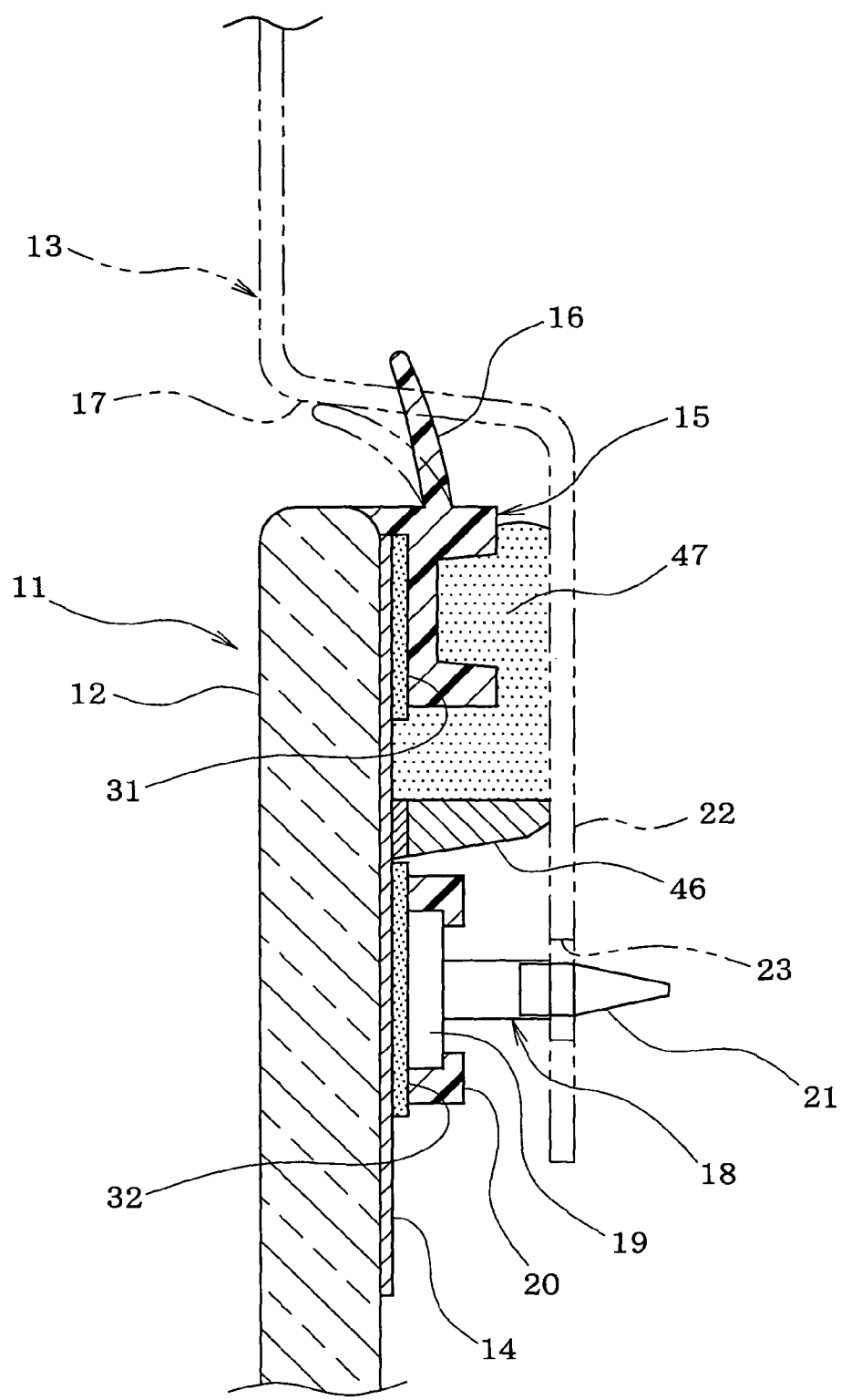
FIG. 3 A sectional view taken along line B-B in FIG. 1.

Positioning fixtures 18 (positioning members) are provided at a plurality of locations respectively on the back surface of the window pane 12 for temporarily fixing the window pane 12 in a positioned state relative to the window frame 13 as shown in FIG. 3. The positioning fixtures 18 are disposed at respective locations away from the covering member 15 toward the center of the surface of the window pane 12 within a range of the opaque colored layer 14 on the back surface of the window pane 12. Each positioning fixture 18 has a proximal end formed with a disc-shaped pedestal 19 which is surrounded by a holding portion 20 thereby to be held. Each holding portion 20 is made by injection molding from the same polymer material as the covering member 15 and is adhered and fixed to the back surface of the window pane 12 by a second adhesive layer 32 which will be described later. Each positioning fixture 18 is made of an elastic material such as polyoxymethylene (POM) resin and has a distal end with an elastically deformable engagement portion 21 formed integrally therewith. When the window assembly 11 is attached to the window frame 13, the engagement portion 21 of each positioning fixture 18 is elastically engaged with an engagement hole 23 formed in a flange 22 of the window frame 13, so that the window assembly 11 can temporarily be fixed while being positioned relative to the window frame 13 until sealant 47 is cured as will be described later.

Figure 4:
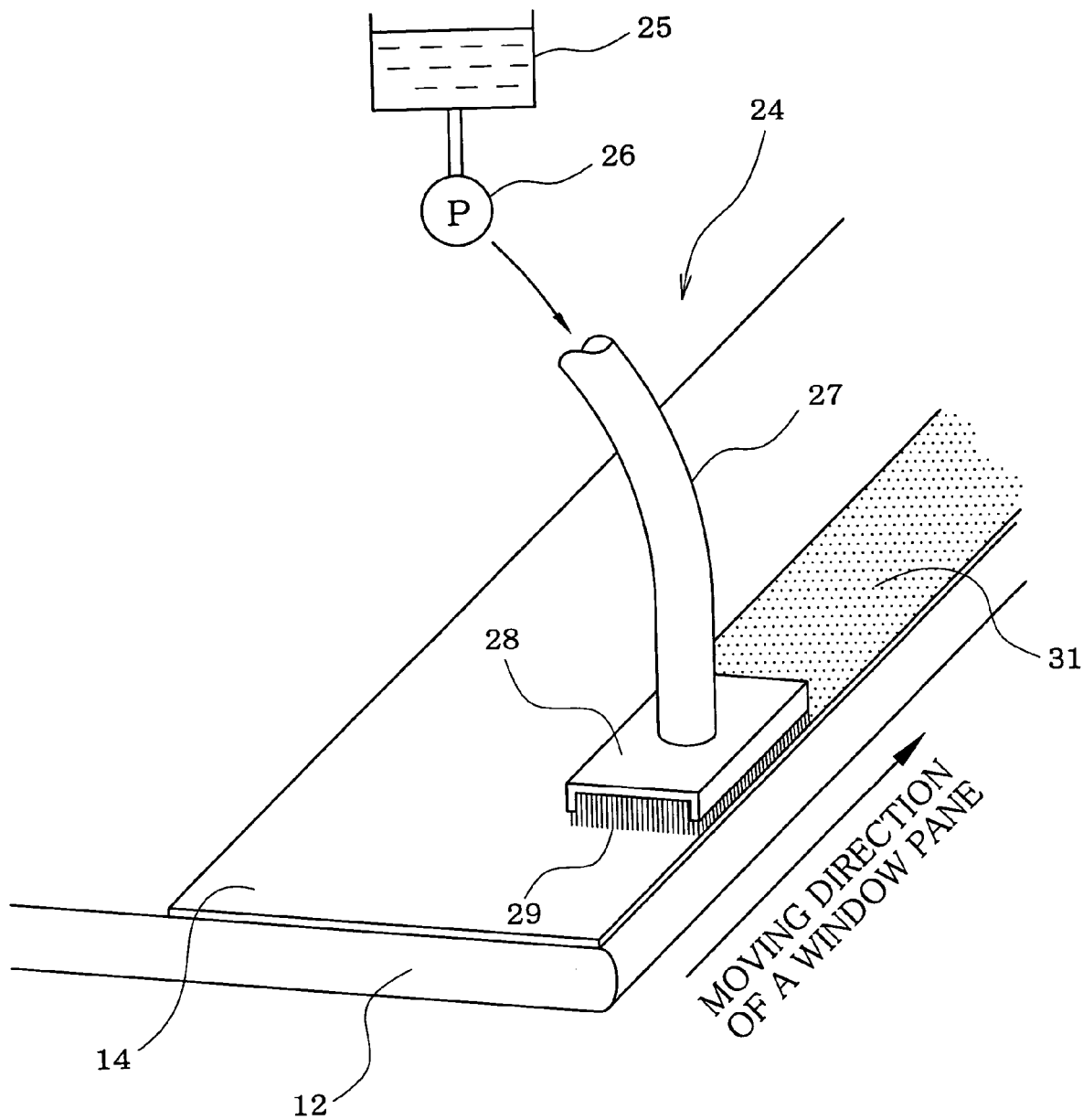
FIG. 4 A perspective view of a schematic construction of an adhesive applying apparatus.

A method of manufacturing the window assembly 11 with the above construction will be described with reference to FIGS. 4 to 7. Firstly, the window pane 12 having the opaque colored layer 14 previously formed at another site is prepared, and the manufacturing sequence proceeds to an adhesive applying step. An adhesive applying apparatus 24 used in the adhesive applying step supplies liquid adhesive stored in an adhesive tank 25 via a supply pipe 27 to an applying head 28 by a pump 26, as shown in FIG. 4. The applying head 28 includes an adhesive applying section 29 which is fixed at a location where the section 29 is in contact with the back surface of the window pane 12 while slightly urged toward the surface of the window pane 12 by a spring or the like (not shown). The window pane 12 is slid in a horizontal direction so that the adhesive is applied to the back surface of the window pane 12. The adhesion applying section 29 of the applying head 28 may be made of a similar material such as a brush-shaped member or sheet fastener or a porous material such as sponge or felt as shown in FIG. 4.

Figure 5:
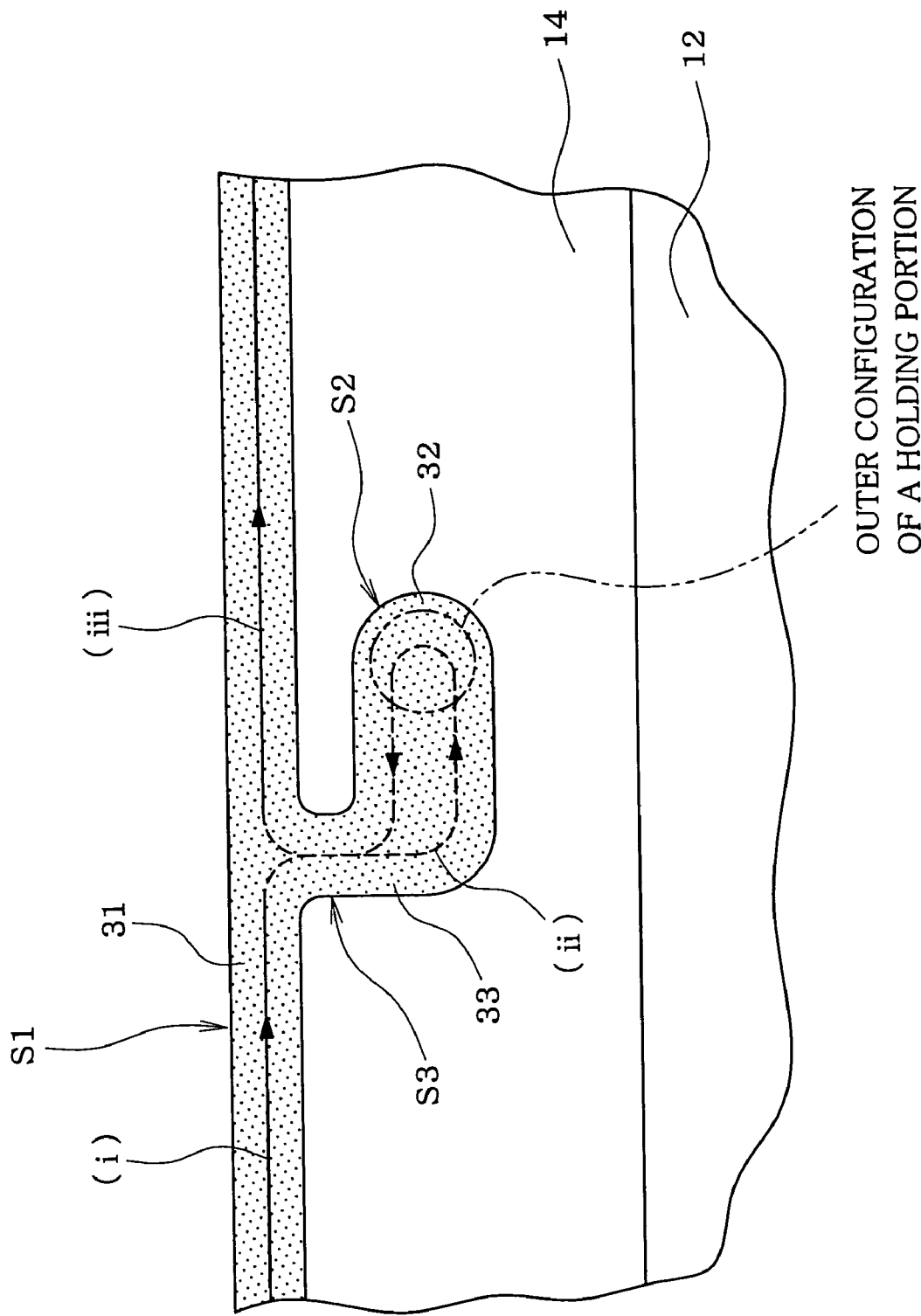
FIG. 5 A rear view of a major part of the window pane for explaining a method of applying the adhesive.

In the adhesive applying step, as shown in FIG. 5, the back surface of the window pane 12 includes a predetermined adhesion area S1 of the covering member 15 (hereinafter referred to "first predetermined adhesion area") to which the adhesive is applied so that a first adhesion layer 31 is formed. The back surface of the window pane 12 also includes a predetermined adhesion layer S2 of the positioning fixture 18 and the holding portion 20 (hereinafter referred to "second predetermined adhesion area") to which the adhesive is applied so that a second adhesion layer 32 is formed. In this case, the adhesive is continuously applied to the first predetermined adhesion area S1 (the predetermined adhesion area of the covering member 15) and the second predetermined adhesion area S2 (the predetermined adhesion areas of the positioning fixture 18 and holding portion 20) of the window pane 12 so that the adhesion layers 31 and 32 of both predetermined adhesion areas S1 and S2 are continuous via a predetermined adhesive continuation area S3. Each of the adhesive layers 31 and 32 preferably has a thickness in a dried state ranging from a fraction of a micron to several tens micron. A third adhesive layer 33 is formed in the predetermined adhesive continuation area S3 at this time. The third adhesive layer 33 also has the same thickness as the adhesive layer 31 or 32.

While the window pane 12 is held by an articulated robot (not shown), the adhesive is continuously applied to the back surface of the window pane 12 in the following manner, for example:

Firstly, the window pane 12 is moved so that the applying head 28 is slid along the first predetermined adhesion area S1, whereby adhesive is applied to the first predetermined adhesion area S1, as shown by solid line (i) in FIG. 5.

Every time the applying head 28 is approached near the second predetermined adhesion area S2, the window pane 12 is slid so that the applying head 28 is relatively moved through a route of the first predetermined adhesion area S1, the adhesive continuation area S3, the second predetermined adhesion area S2, the adhesive continuation area S3 and the first predetermined adhesion area S1, whereby adhesive is applied to the second predetermined adhesion area S2, as shown by broken line (ii) in FIG. 5. In this case, an application range of the adhesive applied to the second predetermined adhesion area S2 is rendered broader than an outer configuration of the end faces of the pedestal 19 of the positioning fixture 18 and the holding portion 20. It is preferable that an application range of the adhesive-applied to the first predetermined adhesion area S1 is also rendered slightly inwardly broader than the width of the covering member 15.

Subsequently, the window pane 12 is again moved so that the applying head 28 is relatively moved along the first predetermined adhesion area S1, whereby the adhesive is applied to the first predetermined adhesion area S1, as shown by solid line (iii) in FIG. 5. An above-described movement of the window pane 12 can be carried out by controlling the drive of the hand of the robot on the basis of a predetermined program.

The manufacturing sequence advances to a drying step after completion of the adhesive applying step. In the drying step, the window pane 12 on which the adhesive has been applied is put into a drying furnace or the like so that a preferably entire window pane 12 is heated. As a result, the adhesive applied portions of the window pane 12 are heated so that volatilization of solvent contained in the adhesive is promoted. The thickness of each adhesive layer is enlarged for the purpose of easy understanding in the drawings.

Figure 6:
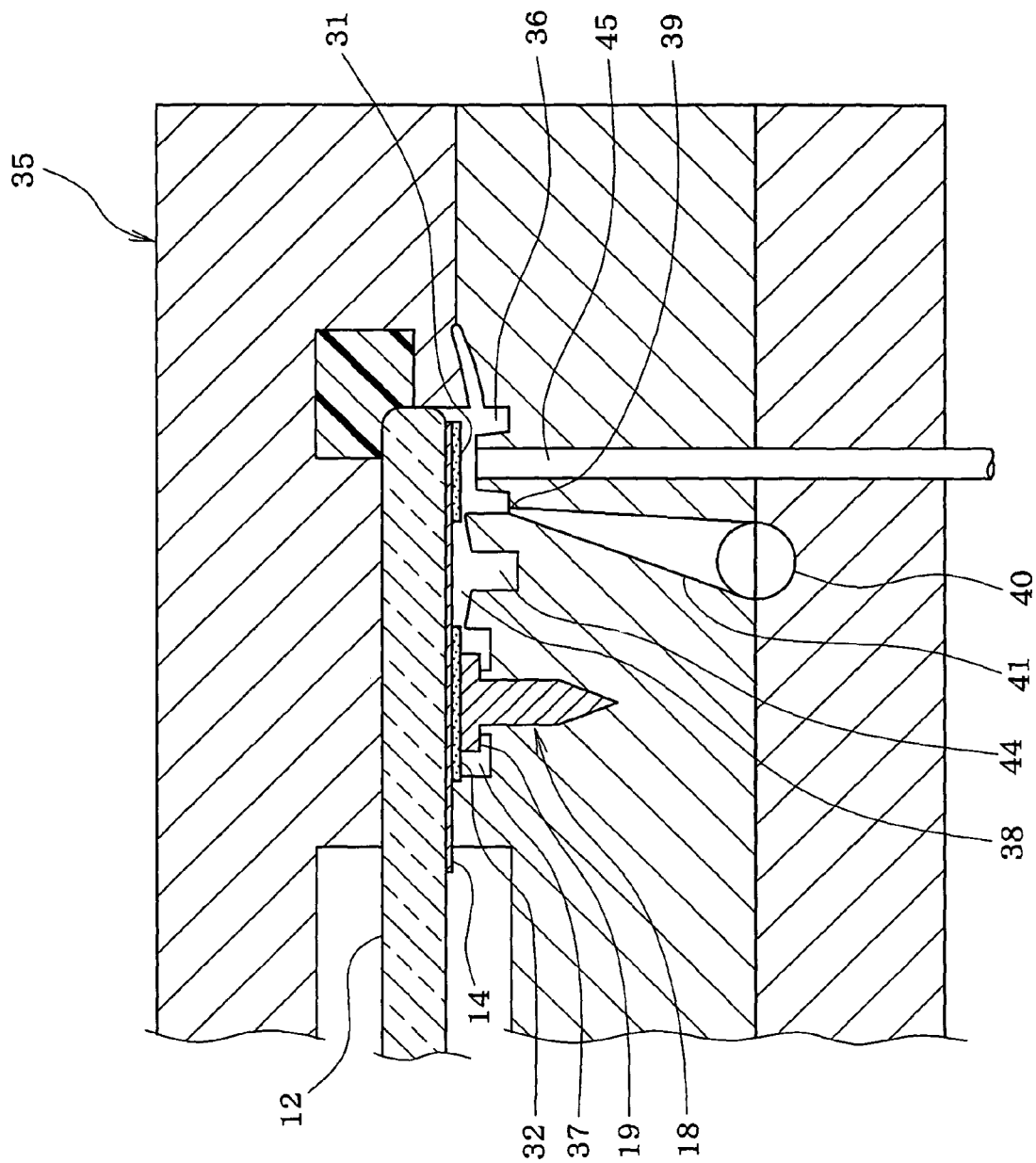
FIG. 6 A sectional view of a major part of an injection mold in the first embodiment.

The manufacturing sequence advances to a forming step after completion of the drying step. As shown in FIG. 6, an injection mold 35 used in the forming step is provided with a covering member forming cavity 36 for forming the covering member 15, a holding portion forming cavity 37 for forming the holding portion 20 holding the pedestal 19 of each positioning fixture 18 and a polymer material flow cavity 38 causing both cavities 36 and 37 to communicate with each other except for a position other than the adhesive continuation area S3 (location where no adhesive is applied). An injection gate 39 is provided on a location of the covering member forming cavity 36 or injection gates 39 are provided on a plurality of locations of the cavity 36 in the lengthwise direction of the cavity 36.

As a result, molten polymer material injected from an injection nozzle (not shown) of an injection molding machine is injected through a runner 40, a sprue 41 and an injection gate 39 of the injection mold 35 into the covering member forming cavity 36. The polymer material injected into the covering member forming cavity 36 is also adapted to flow through the polymer material flow cavity 38 into the holding portion forming cavity 37 thereby to fill the cavity 37.

Furthermore, the polymer material flow cavity 38 is provided with a tab forming cavity 44 for forming a tab 43 (see FIG. 7) integrally with a material flow connection portion 42 (see FIG. 7) formed by the polymer material flow cavity 38. The tab 43 protrudes in such a direction as to part from the window pane 12.

Figure 7:
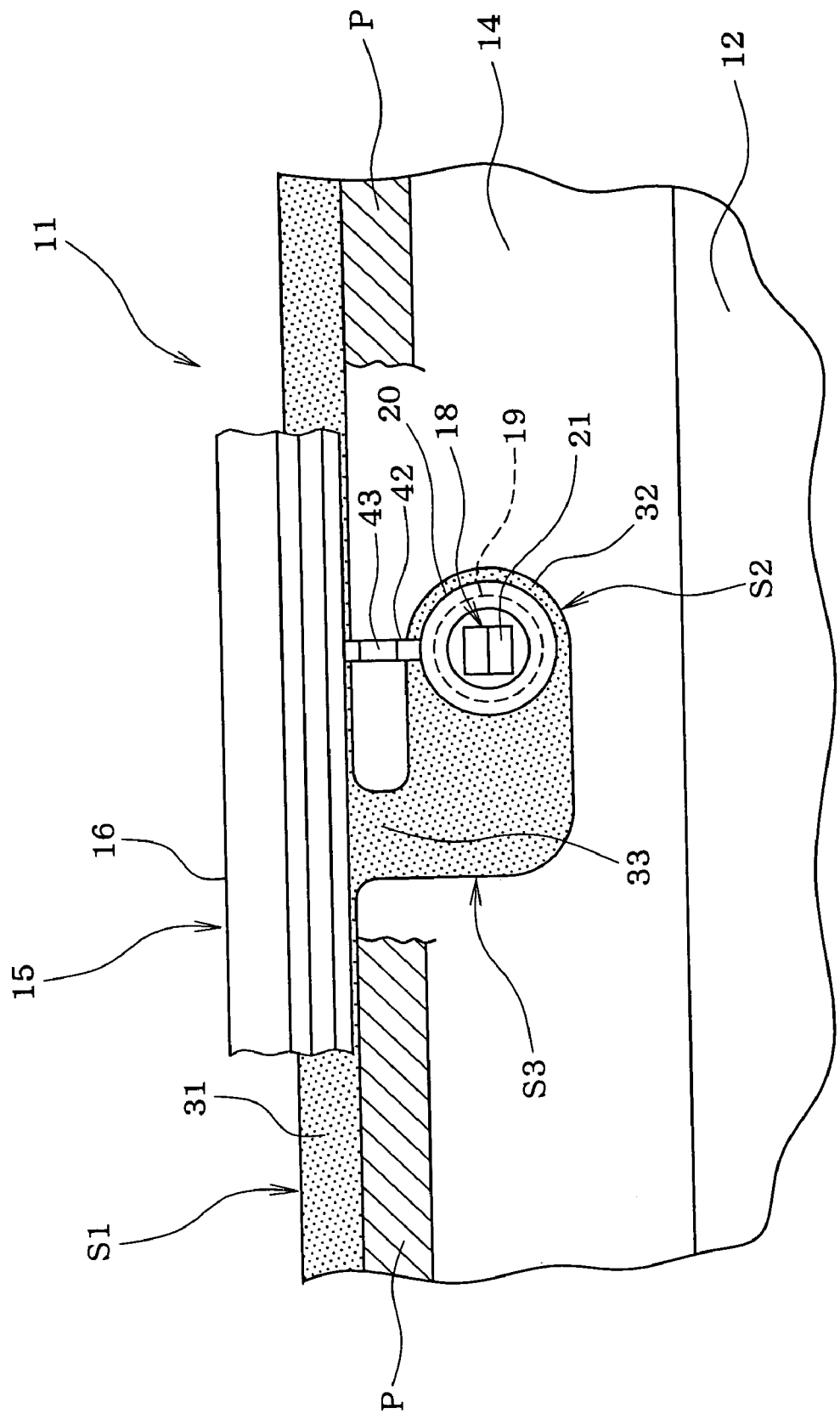
FIG. 7 A rear view of a major part of the window assembly wherein a covering member and a holding portion are connected together by a material flow connection portion.

In the forming step, firstly, the window pane 12 applied with the adhesive and the positioning fixtures 18 are set in the injection mold 35, which is then closed, as shown in FIG. 6. Subsequently, molten polymer material is injected into the injection mold 35 to fill the cavities 36 to 38 and 44 and thereafter, the polymer material is cooled to be solidified or cured, whereby the covering member 15 and the holding portion 20 are formed so as to be connected to each other by the material flow connection portion 42 formed by the polymer material flow cavity 38, as shown in FIG. 7. Furthermore, the covering member 15 and the holding portion 20 are adhered via respective adhesive layers 31 and 32 to the opaque colored layer 14 on the back surface of the window pane 12. As a result, the window assembly 11 is thus manufactured to which the covering member 15 and the holding portion 20 are adhered and fixed while being connected to each other by the material flow connection portion 42. Furthermore, the tab 43 protruding in such a direction as to part from the window pane 12 is formed integrally with the material flow connection portion 42. Subsequently, the injection mold 35 is opened and the window assembly 11 to which the covering member 15 and the holding portion 20 are adhered and fixed in an interconnected state is ejected from the injection mold 35 by ejecting of an ejector pin 45.

The polymer material used to mold the covering member 15 and the holding portion 20 in the forming step may include a general-purpose thermoplastic resin such as acrylonitrile butadiene styrene (ABS) resin, polyvinyl chloride (PVC), polypropylene (PP) or the like, for example. In addition, the polymer material may include an engineering thermoplastic resin such as polyamide (PA), polycarbonate (PC), polyphenylene ether (PPE) or the like, a thermoplastic elastomer such as olefin thermoplastic elastomer (TPO), styrene thermoplastic elastomer (SBC), polyvinyl chloride thermoplastic elastomer (TPVC), polyurethane thermoplastic elastomer (TPU) or the like, or liquid reactive mixture material of polyol and isocyanate both of which react to produce polyurethane (PU). Furthermore, a filler, modifying agent and the like may be mixed in the polymer material in view of environment where the window assembly 11 is used.

An adhesive forming the adhesive layers 31 to 33 preferably comprises an acid modified polyolefin resin or acid modified polyolefin-styrene copolymer resin as a main component when a polymer material from which the covering member 15 and holding portion 20 are molded is TPO or SBC. The adhesive is preferably a polyamide adhesive when the polymer material is PVC.

Upon completion of the forming step, the manufacturing sequence advances to a step where the material flow connection portion 42 is removed from the window assembly 11 to which the covering member 15 and the holding portion 20 are adhered and fixed in an interconnected state. In this step, the tab 43 formed integrally with the material flow connection portion 42 is pinched and pulled in such a direction that the material flow connection portion 42 is parted from the window pane 12 thereby to be removed. Consequently, the opaque colored layer 14 is exposed at a removed portion. When the material flow connection portion 42 is removed, cut may be formed by a knife and the like in a predetermined removed portion of the material flow connection portion 42 and covering member 15 and in a predetermined removed portion of the material flow connection portion 42 and the holding portion 20. Furthermore, these predetermined removed portions may be cut by a knife or the like. As a result, the manufacturing of the window assembly 11 can be completed.

The reason for removal of the material flow connection portion 42 is as follows: if paste-like urethane sealant 47 which will be described later should be disposed onto the material flow connection portion 42 in the shape of a string with the material flow connection portion 42 remaining, the sealant 47 would not be distributed to a concave corner happened in a boundary between a side of the material flow connection portion 42 and the back surface of the window pane 12, whereupon a small gap would be occurred. There is a possibility that water may invade through the gap.

When the window assembly 11 thus manufactured is mounted to the window frame 13, a dam 46 for holding back the sealant is secured by adhering or the like to a position on the back surface of window pane 12 away from the covering member 15 toward the center of the surface of the window pane 12 within a range of the opaque colored layer 14, as shown in FIGS. 2 and 3. Then, as shown in FIG. 7, a liquid primer P ("HAMATITE WS-202" sold by THE YOKOHAMA RUBBER CO., LTD., for example) improving adhesion strenght with the sealant 47 is continuously applied to an entire periphery in a discharge area of the sealant 47 so that a thickness in a dried state ranges from a fraction of a micron to several tens micron, if necessary. The primer is partially eliminated in FIG. 7 for the purpose of preventing the figure from being complicated. Subsequently, the paste-like urethane sealant 47 is disposed along a peripheral edge toward a peripheral side of the dam 46 at an inner peripheral side of the covering member 15 on the back surface of the window pane 12. In this case, the sealant 47 is discharged onto the opaque colored layer 14 between the positioning fixture 18 and the covering member 15 at the position of the positioning fixture 18. Subsequently, the window assembly 11 is fitted with the window frame 13, and the paste-like sealant 47 is interposed between the back surface of the entire peripheral edge of the window pane 12 and the flange 22 of the window frame 13. In this state, the sealant 47 is cured such that the window assembly 11 is adhered to the window frame 13 to be fixed, and a gap between the window assembly 11 is fitted with the window frame 13 is sealed. At this time, the engagement portion 21 of each positioning fixture 18 fixed to the back surface of the window pane 12 is elastically engaged with the engagement hole 23 of the flange 22 of the window frame 13, whereby the window assembly 11 is temporarily fixed while being positioned in the direction horizontal with the surface of the window pane 12 and in the direction of thickness relative to the window frame 13. Consequently, the window assembly 11 is prevented from being displaced while the sealant 47 is cured.

In the predetermined adhesive continuation area S3, the primer P is applied onto the adhesive layer 33, onto which the sealant 47 is disposed. A sum total of the thicknesses of the adhesive layer 33 and the primer P ranges from several microns to 200 micron and accordingly the adhesive continuation area S3 is substantially in flat surface. As a result, no gap is happened between the adhesive continuation area S3 and the sealant 47 when the sealant 47 is disposed. Furthermore, since the above-described adhesive applied to the adhesive continuation area S3 to be formed into the adhesive layer 33 has a good adhesion to the primer P, the window pane 12 (opaque colored layer 14) undergoes no adverse effect such as a reduction in the sealing performance of the sealant 47.

In the above-described embodiment 1, the adhesive is continuously applied to the first predetermined adhesion area S1 (the predetermined adhesion area of the covering member 15) and the second predetermined adhesion area S2 (the predetermined adhesion areas of the positioning fixture 18 and holding portion 20) of the window pane 12 so that the adhesive layers 31 and 32 of both predetermined adhesion areas S1 and S2 are continuous via the adhesive continuation area S3. Accordingly, since the work of applying the adhesive to the window pane 12 need not be divided into a plurality of times, the adhesive applying work can be simplified and carried out efficiently. Furthermore, the adhesive can uniformly be applied to the predetermined adhesion areas S1 and S2, and the thicknesses of the adhesive layers 31 and 32 of the predetermined adhesion areas S1 and S2 and the drying time can substantially be equalized, whereupon stable adhesive strength can be achieved. Moreover, the used injection mold 35 has the polymer material flow cavity 38 causes the covering member forming cavity 36 and holding portion forming cavity 37 to communicate with each other at the position other than the adhesive continuation area S3. Accordingly, the material flow connection portion 42 can be avoided being adhered to the window pane 12 and can accordingly be removed easily.

Furthermore, in the embodiment 1, an application range of the adhesive applied to the second predetermined adhesion area S2 (predetermined adhesion areas of the positioning fixture 18 and the holding portion 20) of the window pane 12 is rendered broader than an outer configuration of the end faces of the pedestal 19 of the positioning fixture 18 and the holding portion 20 in the adhesive applying step. Accordingly, an entire end face of the holding portion 20 is reliably adhered close to the adhesive layer, whereupon the holding portion 20 can reliably be adhered to the window pane 12 to be fixed.

Furthermore, in the embodiment 1, the window pane 12 is moved in the adhesive applying step while the position of the applying head 28 applying adhesive to the window pane 12 is fixed. Accordingly, the construction of the adhesive applying apparatus 24 can be simplified and the cost of the apparatus 24 can be reduced as compared with the case where adhesive is applied while the applying head is being moved. Furthermore, after completion of the adhesive applying step, the system such as a robot having thereto moved the window pane 12 can continuously be used, whereupon the window pane 12 can smoothly be conveyed to the subsequent heating-drying step.

Furthermore, in the embodiment 1, the tab 43 protruding in such a direction as to part from the window pane 12 is formed integrally on the material flow connection portion 42 in the forming step. Accordingly, when the material flow connection portion 42 is to be removed, the tab 43 is pinched and pulled such that the material flow connection portion 42 can be pulled in such a direction as to part from the window pane 12 thereby to be removed. Consequently, the work of removing the material flow connection portion 42 can be simplified and carried out efficiently.

Furthermore, in the embodiment 1, the adhesive-applied portion of the window pane 12 is previously heated in the drying step before the forming step. Accordingly, when the polymer material is injected, the solvent of the adhesion applied to the windowpane 12 can stably be volatilized, whereupon the adhesion strength can be rendered stable.

Embodiment 2

Next, embodiment 2 will be described using FIG. 8. In embodiment 2, substantially identical or similar parts are labeled by the same reference symbols as those in embodiment 1 and description of these parts will be simplified. The difference of embodiment 2 from embodiment 1 will be described.

The covering member 15 and the holding portion 20 are formed while the positioning fixtures 18 is set in the injection mold 35 in embodiment 1. In embodiment 2, however, the covering member 15 and the holding portion 20 are made of the polymer material and thereafter, the positioning fixtures 18 previously made separately are attached to the holding portion 20.

Figure 8:
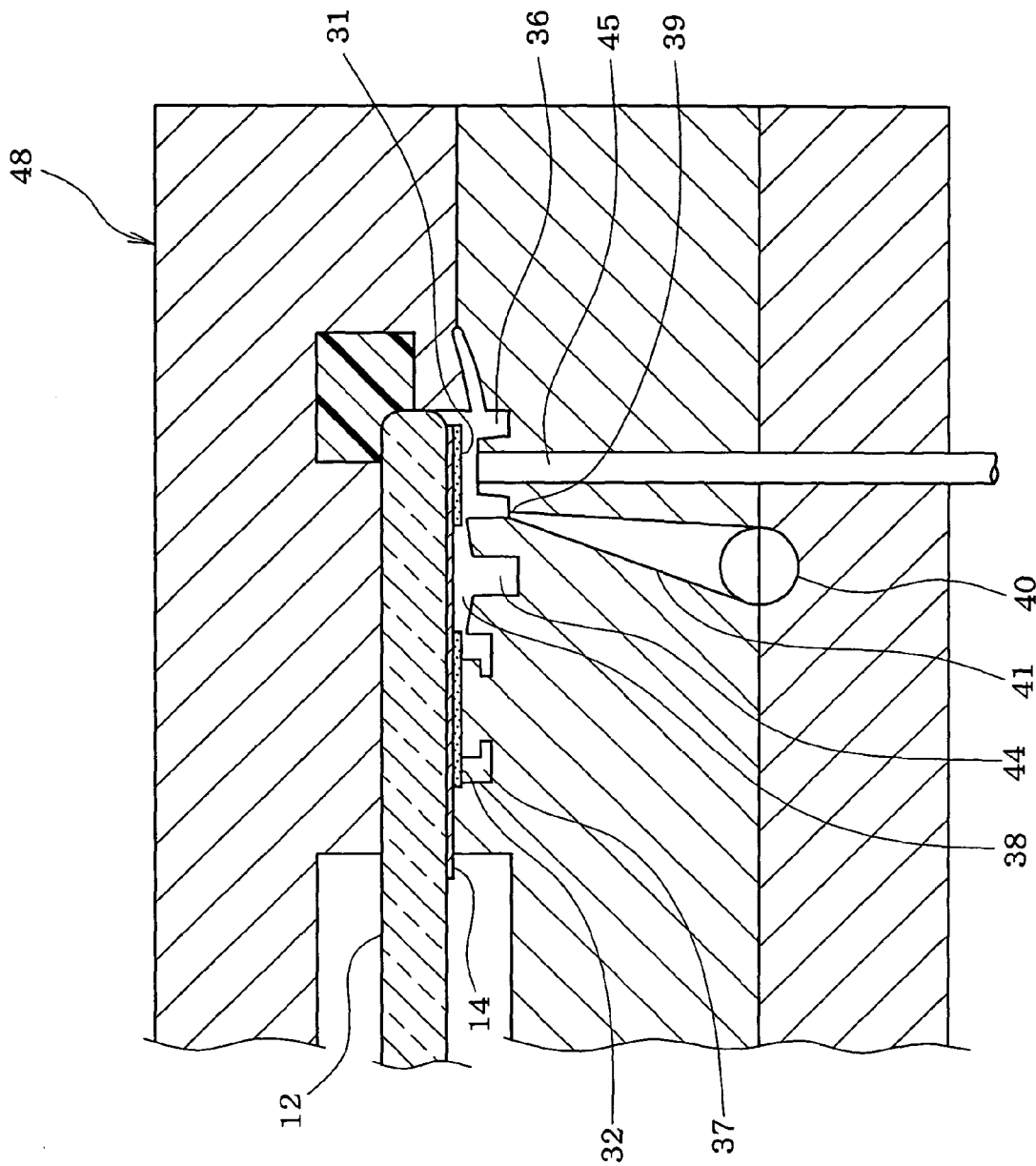
FIG. 8 A sectional view of a major part of an injection mold in a second embodiment.

A space for setting the positioning fixtures 18 is eliminated in the injection mold 48 used in the forming step in embodiment 2, as shown in FIG. 8. In the forming step, only the window pane 12 applied with the adhesive in the same manner as in embodiment 1 is set in the injection mold 48, and the polymer material is then injected thereby to fill the injection mold 48. As a result, the covering member 15 and the holding portion 20 are formed so as to be connected by the material flow connection portion 42. The covering member 15 and the holding portion 20 are adhered via the adhesive layers 31 and 32 to the opaque colored layer 14 on the back surface of the window pane 12 to be fixed.

The material flow connection portion 42 is removed after completion of the forming step and subsequently, the positioning fixtures 18 previously made separately are attached to the holding portion 20. Alternatively, the previously made positioning fixtures 18 may be attached to the holding portion 20 and thereafter, the material flow connection portion 42 may be removed.

In embodiment 2, the positioning fixtures 18 are attached to the holding portion 20 after the covering member 15 and the holding portion 20 have been made of the polymer material. Accordingly, the positioning fixtures 18 need not be set in the mold 48 in the forming step and consequently, limitations to the shapes of cavities of the mold 48 and to the shape of the positioning fixtures 18 are reduced, whereupon the construction of the mold 48 can be simplified and a degree of freedom in the design of the positioning fixtures 18 can be increased. Thus, embodiment 2 has an advantage that a positioning fixture 18 having a complicated shape can be used.

Embodiment 3

Next, embodiment 3 will be described using FIGS. 9 and 10. In embodiment 3, substantially identical or similar parts are labeled by the same reference symbols as those in embodiments 1 and 2 and description of these parts will be simplified. The differences of embodiment 3 from embodiments 1 and 2 will be described.

Only the holding portion 20 holding the positioning fixture 18 is made of the same polymer material as the covering member 15 by the injection molding in the second embodiment. In the third embodiment, however, the entire positioning member 50 for positioning the window pane 12 relative to the window frame 13 is made of the same polymer material as the covering member 15 by the injection molding and adhered to the opaque colored layer 14 of the back surface of the window pane 12 to be fixed, as shown in FIG. 9. The positioning member 50 includes the pedestal 51 formed integrally and coaxially with a protrusion 50a having a tapered face at the distal end side and a smaller diameter. When the window assembly 49 is attached to he window frame 13, the protrusion 50a of the positioning member 50 is inserted into the engagement hole 23 of the flange 22 of the window frame 13 so that the end face 51a of the pedestal 51 is abutted against the flange 22. As a result, the window assembly 49 is adapted to be positioned relative to the window frame 13 in the direction horizontal to the surface of the window pane 12 while a predetermined gap is maintained between the flange 22 and the window pane 12.

When the above-described window assembly 49 is manufactured, the adhesive is applied in the same manner as in embodiment 1 to the predetermined adhesion area of the covering member 15 and the predetermined adhesion area of the positioning member 50 on the back surface of the window pane 12 in the adhesive applying step so that the adhesive layers 31 and 52 of both predetermined adhesion areas are continuous via the adhesive continuation area with each other.

Figure 10:
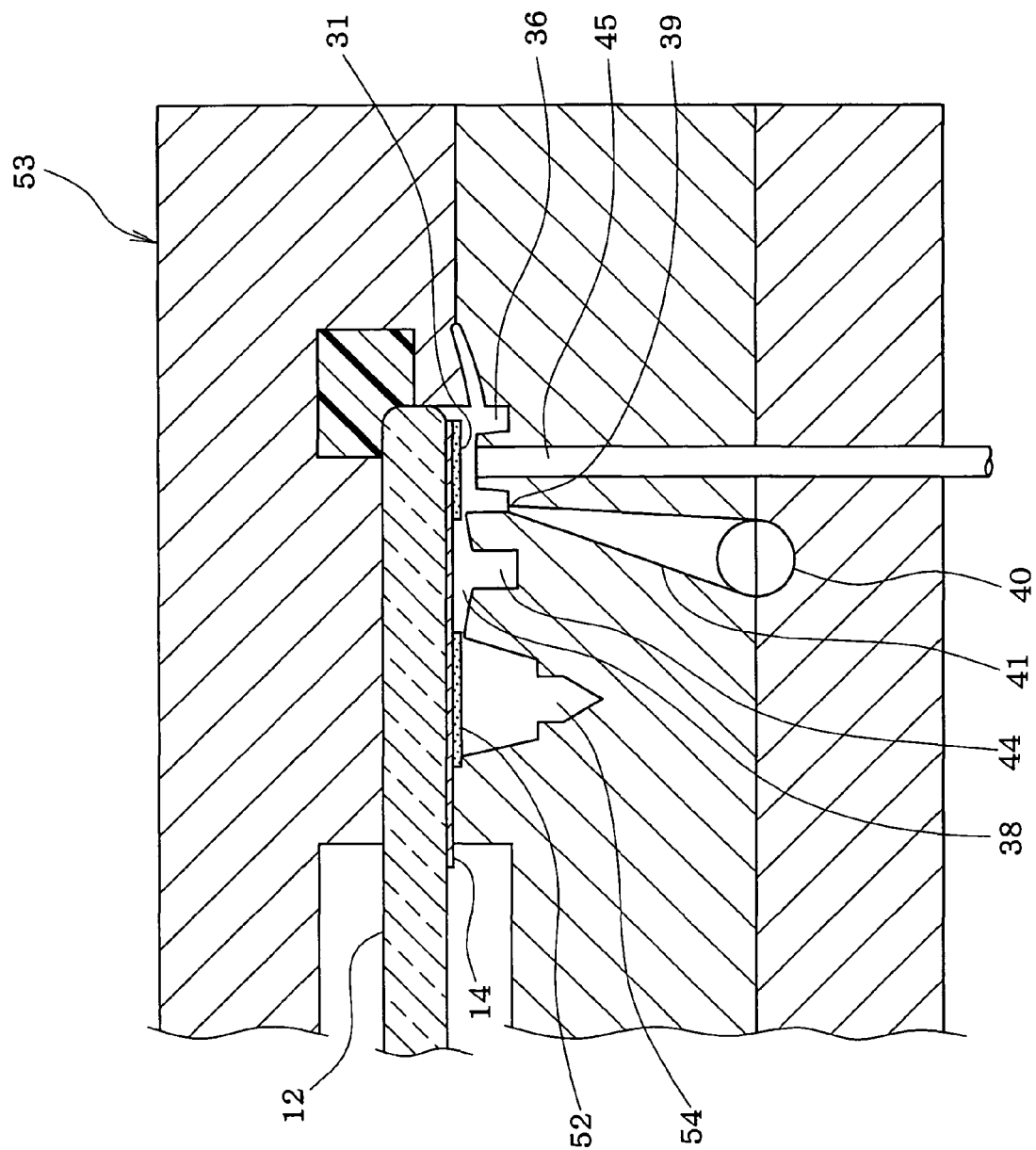
FIG. 10 A sectional view of a major part of an injection mold in a third embodiment.

Furthermore, as shown in FIG. 10, the injection mold 53 used in the forming step is provided with the covering member forming cavity 36, the positioning member forming cavity 54 for forming the positioning member 50 and the polymer material flow cavity 38 causing both cavities to communicate with each other at the location other than the adhesive continuation area of the window pane 12.

In the forming step, only the window pane 12 applied with the adhesive is set in the injection mold 53, and the polymer material is discharged to fill the mold 53. Consequently, the covering member 15 and the positioning member 50 are formed so as to be connected to each other by the material flow connection portion 42. The covering member 15 and the positioning member 50 are adhered via the adhesive layers 31 and 52 respectively to the opaque colored layer 14 of the back surface of the window pane 12. The material flow connection portion 42 is removed after completion of the forming step.

Figure 9:
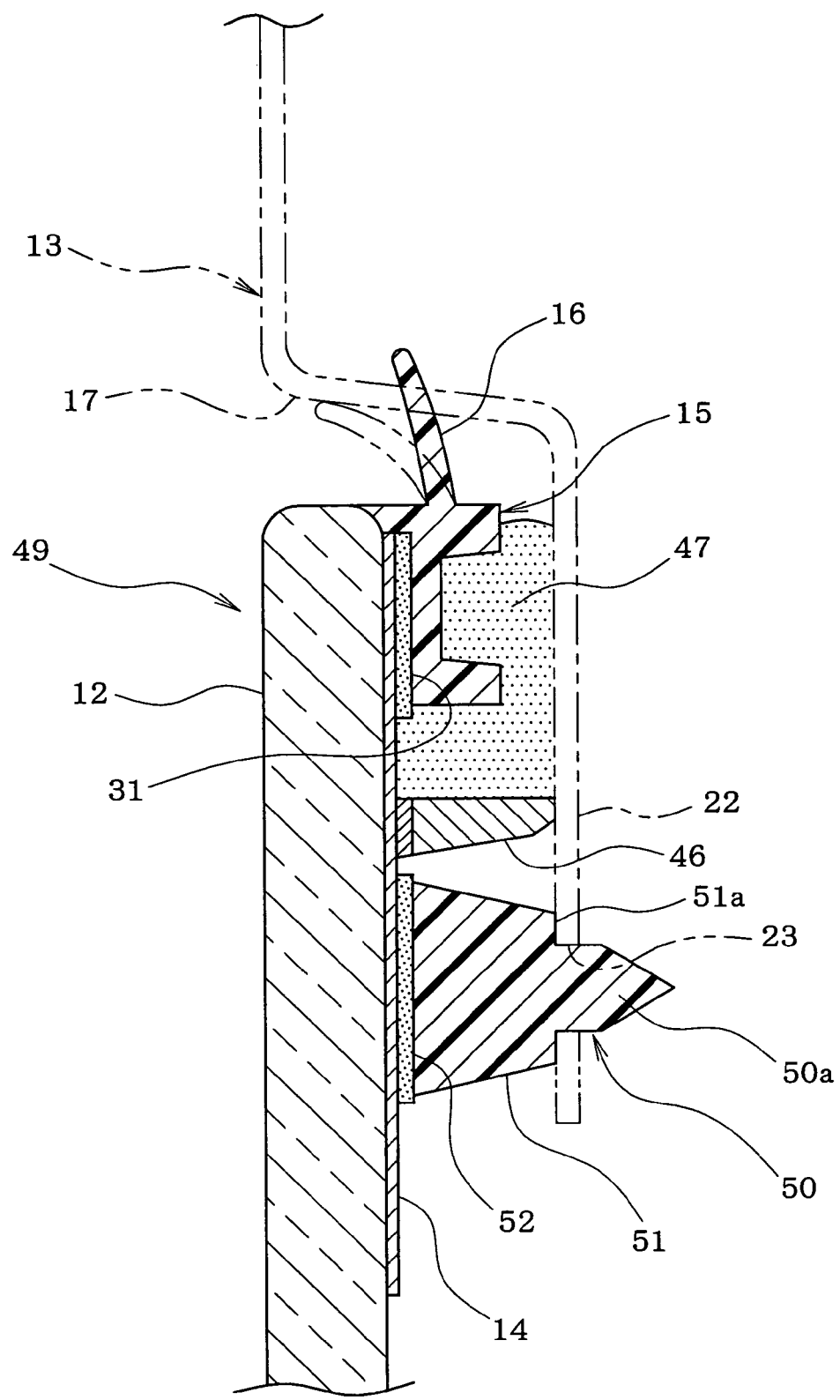
FIG. 9 A sectional view of a major part of window assembly of the third embodiment.

When the manufactured window assembly 49 is attached to the window frame 13, the protrusion 50a of each positioning member 50 fixed to the back surface of the window pane 12 is inserted into the corresponding engagement hole 23 of the flange 22 of the window frame 13 and the end face 51a of the pedestal 51 is abutted against the flange 22, as shown in FIG. 9. The window assembly 49 is positioned relative to the window frame 13 while a predetermined space is retained between the flange 22 and the window pane 12. Consequently, the window assembly 49 is prevented from being displaced until the sealant 47 is cured.

In the above-described embodiment 3, the covering member 15 and the positioning member 50 are simultaneously formed by the injection molding. Accordingly, the positioning member 50 is made of the same polymer material that is made into the covering member 15, whereupon the number of parts can be reduced. Furthermore, since no positioning member 50 needs to be mounted, the production cost of the window assembly 49 can be reduced.

Embodiment 4

Figure 11:
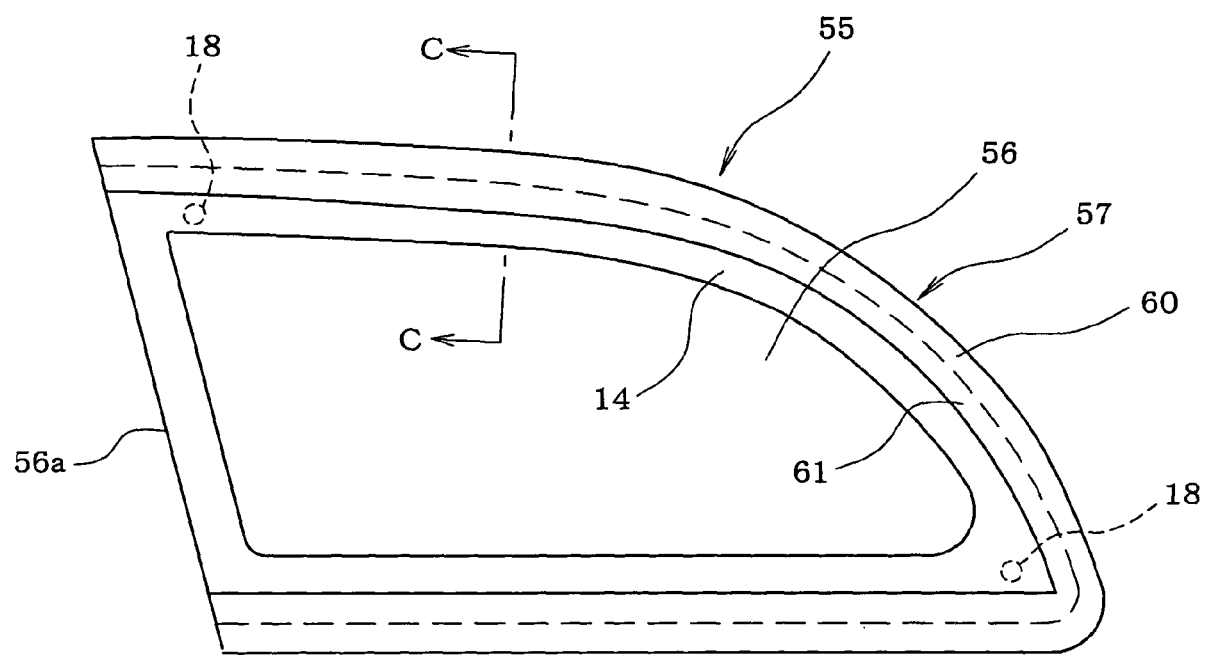
FIG. 11 A front view of window assembly of a fourth embodiment.
Figure 12:
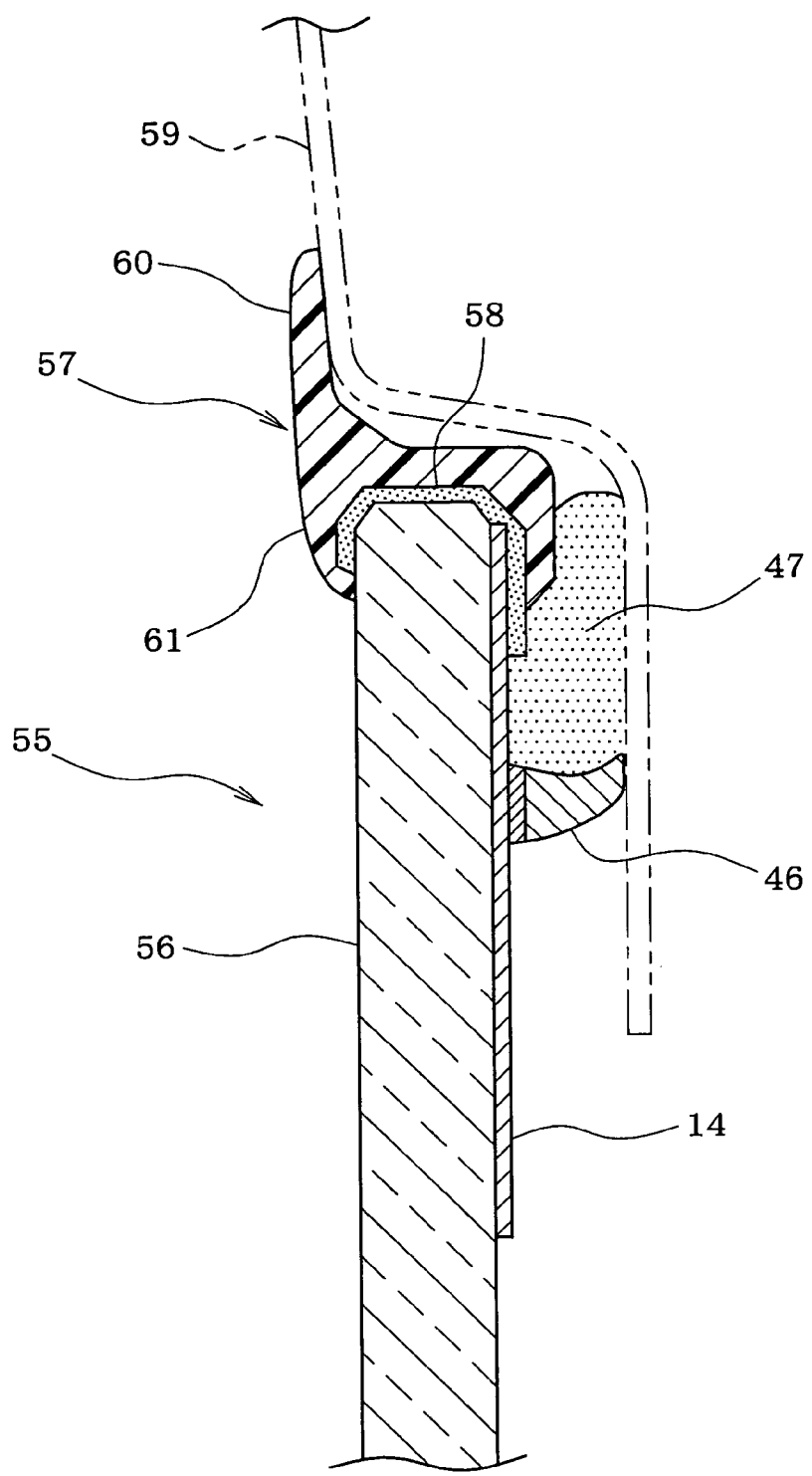
FIG. 12 A sectional view taken along line C-C in FIG. 11.

Next, embodiment 4 in which the present invention is applied to a window assembly for quarter window of an automobile will be described with reference to FIGS. 11 and 12. In embodiment 4, substantially identical or similar parts are labeled by the same reference symbols as those in embodiment 1 and description of these parts will be simplified. The difference of embodiment 4 from embodiment 1 will be described.

A window pane 56 (quarter window glass) of a window assembly 55 for a quarter window glass includes a long covering member 57 provided along a portion of a peripheral edge of the window pane 56 except for the front side 56a. The covering member 57 extends from the surface of the peripheral edge of the window pane 56 to the back surface of the window pane 56. The covering member 57 is adhered and fixed to the window pane 56 via an adhesive layer 58 formed by applying adhesive to the surface, back surface and end face of the peripheral edge of the window pane 56. The lip 60 covering a gap between the covering member 57 and the window frame 59 and a decorative portion 61 covering the peripheral edge of the surface of the window pane 56 are formed integrally on a base of the covering member 57.

When the window assembly 55 is manufactured, the adhesive is continuously applied to a predetermined adhesion area of the covering member 57 of the window pane 56 and a predetermined adhesion areas of the positioning fixture 18 and the holding portion 20 in the adhesive applying step so that the adhesive layers 58 and 32 of both predetermined adhesion areas are continuous to each other via the adhesive continuation area.

In the forming step, the window pane 12 applied with the adhesive and the positioning fixture 18 are set in the injection mold (not shown). The polymer material is injected so as to fill the mold, whereupon the covering member 57 and the holding portion 20 are formed into a shape so as to be connected to each other by the material flow connection portion 42. The covering member 57 and the holding portion 20 are adhered via the respective adhesive layers 58 and 32 to the window pane 56 to be fixed. The material flow connection 42 is removed after the forming step.

The positioning fixtures 18 may be attached to the holding portion 20 after the covering member 57 and the holding portion 20 have been made of the polymer material in the same manner as embodiment 2.

Alternatively, the entire positioning member 50 may be made from the same polymer material as the covering member 57 by the injection molding so as to be adhered to the back surface of the window pane 56 to be fixed.

In each of the foregoing embodiments 1 to 4, the window pane 12 (56) is moved in the adhesive applying step while the position of the applying head is fixed. However, the applying head 28 may be moved while the window pane 12 (56) is fixed.

In each of the foregoing embodiments 1 to 4, the adhesion applying step may be eliminated and the window pane to which the adhesive has continuously been applied to the predetermined adhesion areas may be obtained so that the window assembly is manufactured.

The window pane with the opaque colored layer 14 previously formed thereon at another location is obtained in each of the foregoing embodiments 1 to 4. However, a step of forming the opaque colored layer 14 on the window pane 12 may be added before the adhesive applying step. The primer may or may not be applied in each of the embodiments 2 to 4 in the same manner as in the embodiment 1.

Furthermore, the locations and shapes of the adhesive continuation area and the material flow connection portion may be changed. It is essential only that the material flow connection portion be formed at a location other than the adhesive continuation area.

Furthermore, when strict water-tightness and air-tightness are not required between the window assembly and the window frame, a sponge-like sealing member with adhesive property can be used, instead of the paste-like sealant.

INDUSTRIAL APPLICABILITY

The present invention should not be limited to the window assembly for the rear window or for the quarter window of automobile. The invention may be applied to a window assembly for a front window or for a side window of automobile. Furthermore, the invention should not be limited to the window assembly of automobile but may be applied to a window assembly of vehicle other than automobile, a window assembly of building, a window assembly of structure or the like.

The invention claimed is:

1. A method of manufacturing a window assembly including a window pane attachable to a predetermined window frame, a long covering member made of a polymer material and formed integrally along at least a part of a peripheral edge of the window pane in order that a gap between the window pane and the window frame may be covered by the covering member, and a positioning member secured to a back surface of the peripheral edge of the window pane so as to be distanced from the covering member in a direction toward a center of the window pane, in order that the window pane may be positioned relative to the window frame, the method comprising:

a providing step providing a window pane that includes a predetermined adhesion area for the covering member and a predetermined adhesion area for at least one of the positioning area and a holding portion for holding the positioning member;

an adhesive applying step continuously applying an adhesive to a predetermined adhesion area of the covering member of the window pane and a predetermined adhesion area of at least one of the positioning member and the holding portion holding the positioning member so that the adhesive of both predetermined adhesion areas are continuous with each other via a predetermined adhesive connection area, wherein the adhesive applying step comprises:

moving one of an applying head of an adhesive and the window pane so that the applying head is continuously slid in a predetermined direction along a peripheral edge of the window pane, while the adhesive is supplied to the applying head, thereby continuously applying the adhesive to a first predetermined adhesion area along a peripheral edge of the applying head;

when the applying head has reached a predetermined location near a second predetermined adhesion area on the peripheral edge of the window pane, moving one of the applying head and the window pane so that the applying head is continuously slid in such a direction that the applying head is directed from the peripheral edge of the window pane to a central side of the window pane, thereby forming the adhesive connection area, moving one of the applying head and the window pane so that a moving direction of the applying head is reversed at a distal end side of the adhesive connection area, thereby continuously applying the adhesive to the second predetermined adhesion area to form an adhesive layer, moving one of the applying head and the window pane so that the applying head is slid toward the predetermined location on the peripheral edge of the window pane after the forming of the adhesive layer, and moving one of the applying head and the window pane so that the applying head is continuously slid in the predetermined direction along the peripheral edge of the window pane when the applying head has been returned to the predetermined location on the peripheral edge of the window pane, thereby continuously applying the adhesive to the first predetermined adhesion area to form an adhesive layer continuous to the first predetermined adhesion area;

a forming step in which the window pane to which the adhesive has been applied is set in an injection mold having a cavity for forming the covering member, a cavity for forming the positioning member or the holding portion and a polymer material flow cavity causing both cavities to communicate with each other at a position other than the adhesive connection area, wherein a predetermined polymer material is injected into the injection mold to fill the cavities of the injection mold so that the covering member and the positioning member or the holding portion are formed, whereby the covering member and at least one of the positioning member and the holding portion are connected to each other by a material flow connection portion formed by the polymer material flow cavity, the polymer material flow cavity and material flow connection portion being located at the position other than the adhesive connection area, and wherein the covering member and the positioning member or the holding portion except for the material flow connection portion are adhered via the respective adhesive to the window pane thereby to be fixed; and a step of removing the material flow connection portion after the forming step.

2. The window assembly manufacturing method according to claim 1, wherein the positioning member is initially set in the cavity for forming the holding portion and the holding portion is formed by injecting polymer material into the cavity.

3. The window assembly manufacturing method according to claim 1, wherein the holding portion is formed by injecting polymer material into the cavity for forming the holding portion and the method further comprises:

a step of attaching the positioning member to the holding portion after the forming step.

4. The window assembly manufacturing method according to claim 1, wherein the positioning member is formed by injecting polymer material into the cavity for forming the positioning member.

5. The window assembly manufacturing method according to claim 1, wherein, in the adhesive applying step, an application range of the adhesive applied to the predetermined adhesion area of at least one of the positioning member of the window pane and the holding portion is broader than an outer configuration of an end face of at least one of the positioning member and the holding portion at the adhesive side.

6. The window assembly manufacturing method according to claim 5, wherein the window pane is moved in the adhesive applying step while an applying head for applying the adhesive to the window pane is fixed to a position.

7. The window assembly manufacturing method according to claim 1, wherein the window pane is moved in the adhesive applying step while the applying head for applying the adhesive to the window pane is fixed to a position.

8. The window assembly manufacturing method according to claim 1, wherein, in the forming step, a tab is formed integrally on the material flow connection portion formed by the polymer material flow cavity so as to protrude in such a direction as to depart from the back surface of the window pane.

9. The window assembly manufacturing method according to claim 1, wherein at least a part of the window pane to which the adhesive has been applied is previously heated in the forming step.

10. A method of manufacturing a window assembly including a window pane attachable to a predetermined window frame, a long covering member made of a polymer material and formed integrally along at least a part of a peripheral edge of the window pane in order that a gap between the window pane and the window frame may be covered by the covering member and a positioning member secured to a back surface of the peripheral edge of the window pane so as to be distanced from the covering member in a direction toward a center of the window pane in order that the window pane may be positioned relative to the window frame, the method comprising:

an adhesive applying step continuously applying an adhesive to a predetermined adhesion area of the covering member of the window pane and to a predetermined adhesion area of at least one of the positioning member and a holding portion holding the positioning member so that the adhesive of both predetermined adhesion areas are continuous with each other via a predetermined adhesive connection area, wherein the adhesive applying step comprises:

moving one of an applying head of an adhesive and the window pane so that the applying head is continuously slid in a predetermined direction along a peripheral edge of the window pane, while the adhesive is supplied to the applying head, thereby continuously applying the adhesive to a first predetermined adhesion area along a peripheral edge of the applying head;

when the applying head has reached a predetermined location near a second predetermined adhesion area on the peripheral edge of the window pane, moving one of the applying head and the window pane so that the applying head is continuously slid in such a direction that the applying head is directed from the peripheral edge of the window pane to a central side of the window pane, thereby forming the adhesive connection area, moving one of the applying head and the window pane so that a moving direction of the applying head is reversed at a distal end side of the adhesive connection area, thereby continuously applying the adhesive to the second predetermined adhesion area to form an adhesive layer, moving one of the applying head and the window pane so that the applying head is slid toward the predetermined location on the peripheral edge of the window pane after the forming of the adhesive layer, and moving one of the applying head and the window pane so that the applying head is continuously slid in the predetermined direction along the peripheral edge of the window pane when the applying head has been returned to the predetermined location on the peripheral edge of the window pane, thereby continuously applying the adhesive to the first predetermined adhesion area to form an adhesive layer continuous to the first predetermined adhesion area;

a forming step in which the window pane to which the adhesive has been applied is set in an injection mold having a cavity for forming the covering member, a cavity for forming the positioning member or the holding portion and a polymer material flow cavity causing both cavities to communicate with each other at a position other than the adhesive connection area, wherein a predetermined polymer material is injected into the injection mold to fill the cavities of the injection mold so that the covering member and the positioning member or the holding portion are formed, whereby the covering member and at least one of the positioning member and the holding portion are connected to each other by a material flow connection portion formed by the polymer material flow cavity, the polymer material flow cavity and material flow connection portion being located at the position other than the adhesive connection area, and wherein the covering member and at least one of the positioning member and the holding portion except for the material flow connection portion are adhered via the respective adhesive to the window pane thereby to be fixed; and a step of removing the material flow connection portion after the forming step.

* * * * *